United States Patent [19]
Hoover

[11] 3,811,657
[45] May 21, 1974

[54] CABLE WINCH HAVING A CLUTCH INCLUDING FRICTION DRIVE AND COOLING MEANS

[76] Inventor: Charles J. Hoover, Box 173, Mill City, Oreg. 97360

[22] Filed: Aug. 15, 1973

[21] Appl. No.: 388,496

Related U.S. Application Data

[63] Continuation of Ser. No. 217,143, Jan. 12, 1972, abandoned.

[52] U.S. Cl.......... 254/187, 192/113 B, 192/85 AA
[51] Int. Cl............................................. B66d 1/00
[58] Field of Search ..... 254/185 R, 185 AB, 185 A, 254/185 B, 187 R, 187 A, 187 B; 192/113 B, 85 AA

[56] References Cited
UNITED STATES PATENTS

| | | | |
|---|---|---|---|
| 3,730,301 | 5/1973 | Heck | 192/113 B |
| 2,498,123 | 2/1950 | Hobbs | 192/113 B |
| 2,869,701 | 1/1959 | Yokel | 192/113 B |
| 2,837,192 | 6/1958 | Dunkelow | 192/113 B |
| 2,159,250 | 5/1939 | Brantly | 254/187 |

*Primary Examiner*—Allen N. Knowles
*Attorney, Agent, or Firm*—D. Paul Weaver

[57] ABSTRACT

A cable winch having a clutch formed of clutch plates for coupling a drum to a rotatable shaft, a mechanism for selectively operating the clutch under a high force wherein the drum and the shaft are locked by the clutch plates for unitary rotation and a low force wherein slippage occurs between the clutch plates and thus between the drum and the shaft, and a mechanism for regulating the supply of oil to the clutch plates for cooling the clutch plates and preventing chatter.

5 Claims, 3 Drawing Figures

CABLE WINCH HAVING A CLUTCH INCLUDING FRICTION DRIVE AND COOLING MEANS

PRIOR RELATED APPLICATIONS

This is a continuation of my copending application Ser. No. 217,143, filed Jan. 12, 1972, now abandoned.

BACKGROUND OF THE INVENTION

This invention relates to a clutch in a cable winch, and more particularly to such a clutch including cooling means.

In multiple drum cable winches used in crane hoisting, derrick hoisting, logging and other applications each drum performs two operations, inhauling or spooling of cable and unspooling of cable. In some operations, such as logging, often the outer ends of two cables on separate drums are connected through a series of cable blocks. While one cable is being spooled on a drum, the connected cable is being unspooled. Reversing the operation changes the function of each drum from performance of one duty to the other (spooling to unspooling and vice versa). In such an arrangement, it is desirable to coordinate the unspooling drum with the spooling drum in such a manner that the desired tautness of the cables is maintained.

The conventional manner for maintaining this cable tension is by application of a brake to the unspooling drum. This system retards unspooling by static friction which by design reduces the efficiency of the machine and increases horsepower demands, as the power used to overcome the brake drag is wasted so far as the accomplishment of the machine function is concerned.

SUMMARY OF THE INVENTION

This invention is concerned with a mechanism for the operation of a drum in a multidrum cable winch that uses a clutch arrangement interposed between a rotatable shaft and the drum so as to enable the drum to either spool or inhaul cable on the drum or to enable the drum to unspool the cable. A control is provided for the clutch that is so consitituted as to either cause the clutch to operate under a relatively high force to thereby lock the drum to the shaft for unitary movement or to operate the clutch under a relatively low force to thereby permit slippage between the shaft and the drum. The relatively high force is utilized when the drum is being used to spool or inhaul the cable and the relatively low force is utilized when the drum is being used to unspool the cable.

In the unspooling operation, the cable is being spooled on a different drum and the slippage permits a coordination between the spooling and unspooling drums such that the desired tautness of the cable is maintained. Unlike an arrangement wherein a brake is applied to the unspooling drum, in this invention the clutch is rotating in the same direction as the unspooling drum. Such an arrangement results in a lower velocity of slippage per revolution than a static brake and induces power back into the gear train of the winch, to a degree, as cable tension increases, and thus tends to raise the efficiency and lower the horsepower requirements of the machine. While existing interlocking winches perform a similar function as the winch of this invention, they require two drive gears and two clutch assemblies per drum, one gear and clutch assembly for spooling the cable, and one gear and clutch assembly for unspooling the cable, resulting in a far more cumbersome and expensive machine than the machine of the invention.

This invention is also concerned with an oiling mechanism for applying oil to the clutch plates. The oiling mechanism performs the functions of lubricating clutch plates of the clutch, thus retarding wear and allowing the clutch to perform smoothly without chatter during its slippage, and of cooling the clutch plates during the slippage to thus prepare the clutch for the more demanding roll of inhauling or spooling without slippage.

It is therefore an object of the present invention to provide a clutch in a winch, for example, having an air conduit selectively supplying a high force or a low force for pressing clutch plates against each other and means for regulating the supply of oil to the clutch to facilitate desired slippage.

DESCRIPTION OF THE PREFERRED EMBODIMENT

Figure 1:
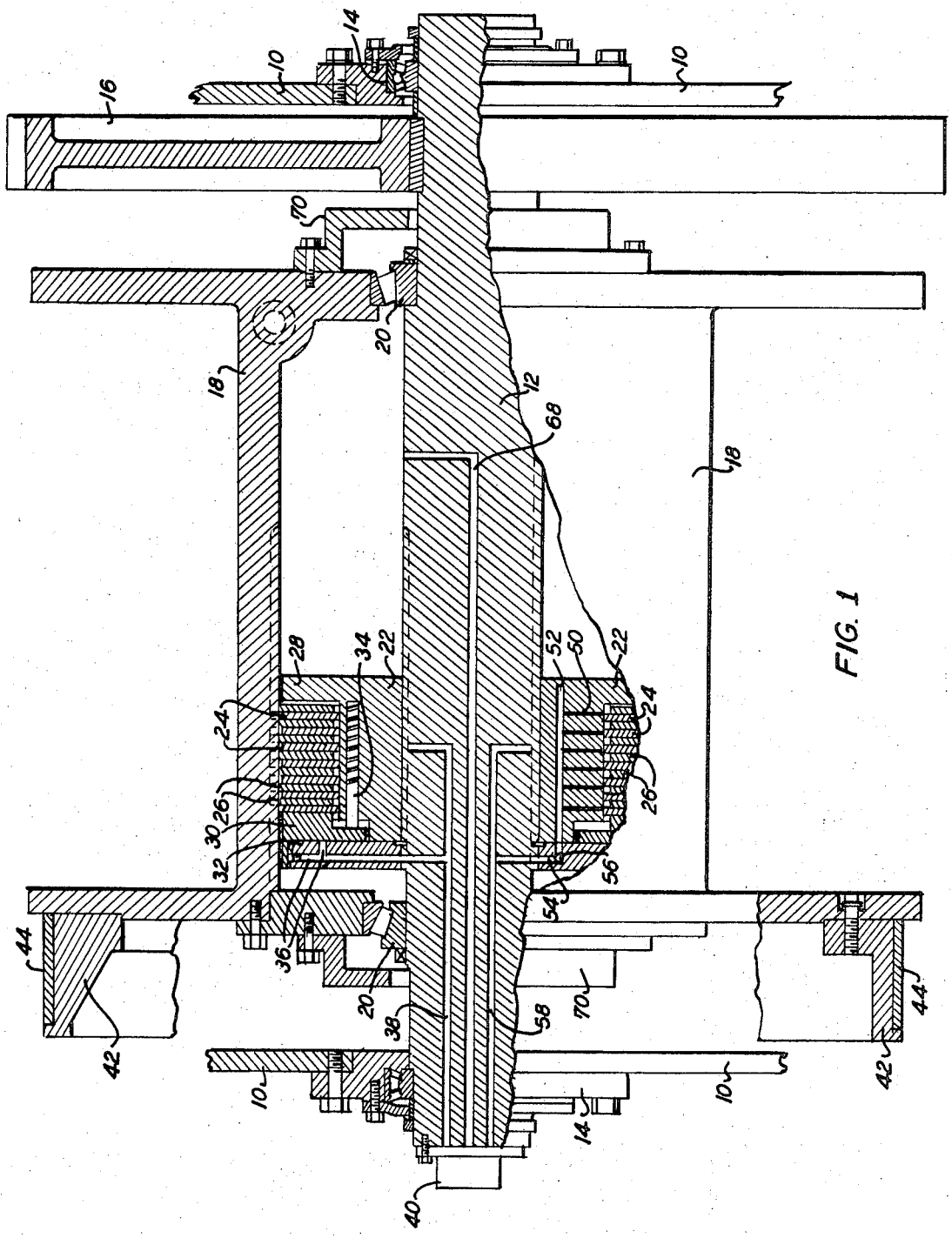
FIG. 1 is a partially sectional view of a portion of the cable winch that includes the drum.

Referring to FIG. 1, the cable winch comprises a frame 10 in which a drum shaft 12 is rotatably mounted by means of shaft bearing assemblies 14. The shaft 12 is secured to a gear 16 which is connected to a source of power. A drum 18 is rotatably mounted on the shaft 12 by means of drum bearings 20. A clutch hub 22 is solidly attached to the shaft 12 interiorly of the drum 18. A plurality of clutch plates 24, splined to the hub 22, are interspersed between a plurality of clutch plates 26 splined to the drum 18. The clutch plates 24, 26 are located between a lug 28 of the hub 22 and a plate 30 that is movable axially of the drum 18 between the clutch plates and an abutment 32 that is secured to the shaft 12. A spring urged plunger 34 acts to urge the plate 30 away from the clutch plates 24, 26. Pressurized air may pass through the abutment 32 through a conduit 36 to drive the plate 30 rightwardly (FIG. 1) to press the clutch plates 24, 26 against each other. The conduit 36 is in communication with a conduit 38 in the shaft 12, and the conduit 38 is in communication with a multiple port rotary seal 40 that is mounted to an end of the shaft 12. A source of air pressure is in communication with the conduit 38 through a line 41 (FIG. 2) and the seal 40, as described more fully below.

Figure 2:
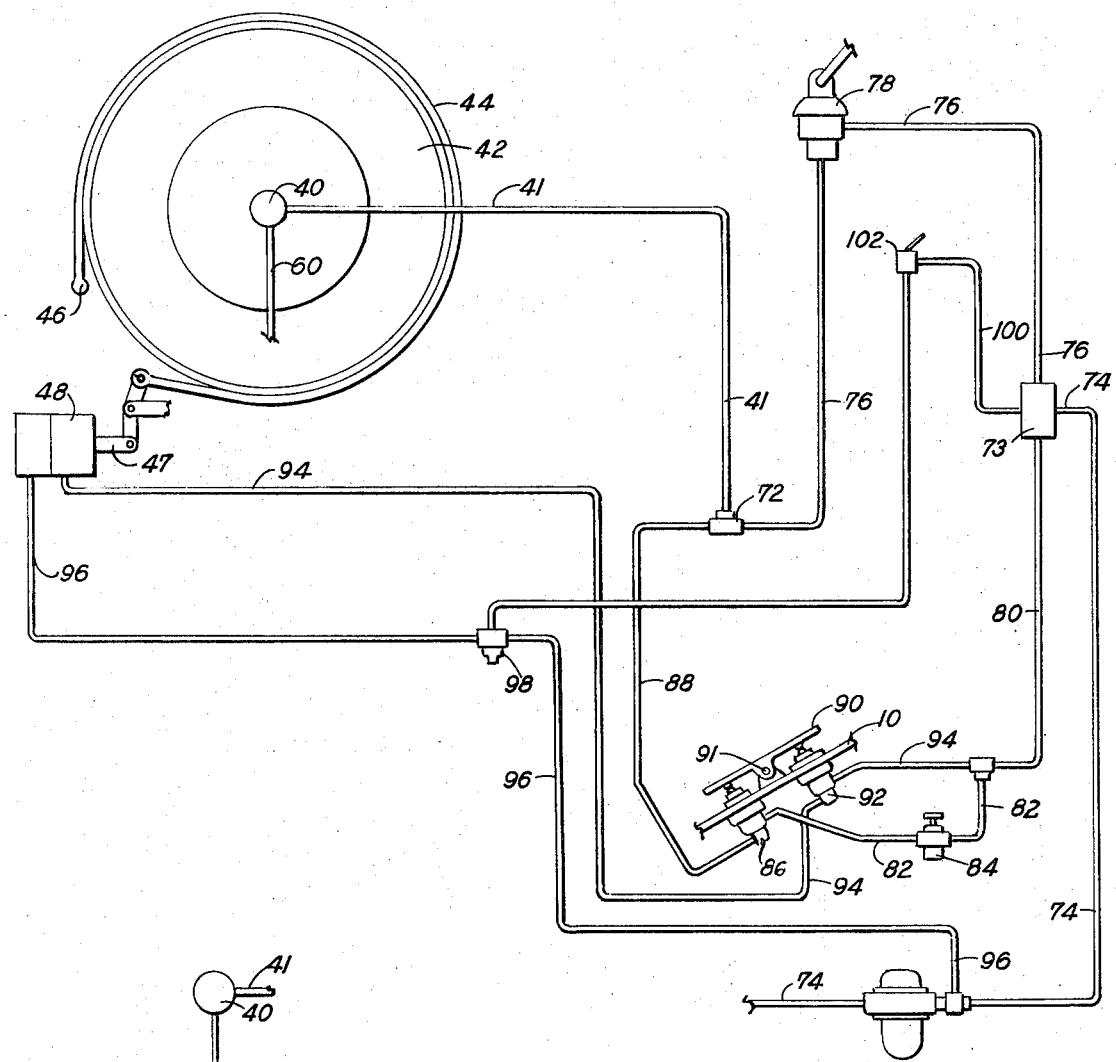
FIG. 2 is a schematic representation of the control system for operating the clutch.

A brake flange 42 is secured to the drum 18, and as seen in FIG. 2, a brake band 44 is wrapped around the brake flange. One end of the brake band 44 is secured to a stationary pin 46, and the other end of the brake band 44 is secured to the piston rod 47 of an air operated spring return motor 48.

Conduits 50 in the hub 22 are in communication with the clutch plates 24, 26. The conduits 50 extend from a conduit 52 in the hub 22 that is in communication with a conduit 54 in the hub 22. A valve 56 is interposed between the conduits 52 and 54 and is located adjacent the clutch plates.

Figure 3:
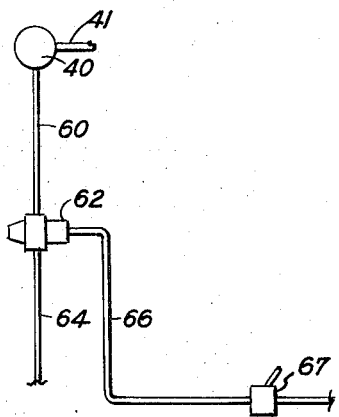
FIG. 3 is a schematic representation of a portion of the oiling mechanism.

The valve 56 is so constructed as to open at a prescribed oil pressure and to also open below said prescribed oil pressure when the temperature at the valve rises above a predetermined amount. The conduit 54 is in communication with a conduit 58 in the shaft 12 and the conduit 58 is in communication with a conduit 60 (FIG. 3) through the seal 40. The conduit 60 is in communication with an oil pressure regulating valve 62 that, in turn, is in communication with a conduit 64. The conduit 64 extends from a source of oil under pressure (not shown).

The valve 62 is so constructed that it can be set to pass oil therethrough at a pressure less than the prescribed pressure that opens the valve 56. An air operated piston in the valve 62 is operable by air passing to the valve 62 from an air line 66 to enable oil to pass through the valve 62 at a pressure greater than the prescribed pressure that opens the valve 56. A valve 67 controls the admission of air into the line 66 from the source of pressurized air. A conduit 68 in the shaft 12 is so constructed as to return surplus oil to the source of oil. Flanges 70, secured to the drum 16 and bearing against the shaft 12, seal the oil within the drum.

Referring to FIG. 2, the line 41 extends from a shuttle valve 72. Air flows to a manifold 73 from a reservoir through a line 74. Air from the manifold 73 can flow to the shuttle valve 72 through two paths. One of the paths is through a line 76 that extends through a manually operable valve 78 that is set to enable air to pass therethrough at a relatively high pressure. The other path is through lines 80 and 82, a pressure regulator 84 that is set to pass air therethrough at a lower pressure than the air that passes through the valve 78, a valve 86, and a line 88.

The valve 86 is operated by a pedal 90 that is pivoted to the frame 10 by a pivot pin 91 and is so constructed as to selectively operate either the valve 86 or a valve 92. The valves 86 and 92 are mounted to the frame 10 on opposite sides of the pivot pin 91. A line 94 passes from the line 80, through the valve 92, to the blind end of the motor 48.

A line 96 extends from the line 74, through a relay valve 98, to the blind end of the motor 48. A pilot line 100 extends from the manifold 73, through a manually operable valve 102, to the relay valve 98.

The source of power that is connected to the gear 16, which acts as a drive means, is reversible so that the gear, together with the shaft 12, may be caused to rotate in one direction or the other. When the shaft 12 is rotating in one direction, the drum 18 spools or inhauls cable (not shown) about the drum periphery, and when the shaft 12 is rotating in the other direction, the drum 18 unspools the cable.

When it is desired that the drum 18 spool or inhaul the cable, there should be no slippage between the rotating shaft 12 and the drum 18. Therefore, during inhauling, the valve 78 is opened to enable air under relatively high pressure to flow through the line 76, the shuttle valve 72, the line 41, the seal 40 and the conduits 38 and 36 to thereby press the clutch plates 24, 26 against each other under relatively high pressure or force and thus lock the shaft 12 and the drum 18 for rotation in unison.

When the drum 18 is to be rotated so as to unspool the cable, the cable, in such operations as logging, is being spooled on another drum (not shown). In such an arrangement, it is desirable to so coordinate the rotation of the unspooling drum with the spooling drum that the desired tautness of the cable is maintained. This is accomplished in this invention by swinging the pedal 90 so as to open the valve 86. At this time, the valve 78 is closed. The opening of the valve 86 enables air to flow through the line 88, the shuttle valve 72 and the line 41 under the relatively low pressure of the pressure regulator 84 and thus causes the clutch plates 24, 26 to be pressed against each other under a relatively low pressure or force that permits slippage between the clutch plates.

As an alternative to the pressing of the clutch plates 24, 26 under relatively low pressure during the unspooling operation of the drum 18, the pedal 90 may be shifted to close the valve 86 and open the valve 92. The opening of the valve 92 enables pressurized air to pass through the line 94 to the blind end of the motor 48 to cause the piston rod 47 to project out of the motor 48 against the force of the motor return spring and thus apply the brake band 44 to the brake flange 42, thus restraining the rotation of the drum 18 about the shaft 12 that is caused by the drum that is inhauling the cable that is being unspooled by the drum 18.

As an emergency measure, the valve 102 may be shifted to cause air to pass from the pilot line 100 to the valve 98 to open the valve 98, the opening of the valve 98 causing air in the line 96 to vent through the valve 98 and thus enable a spring in the motor 48 to project the piston rod 47 out of the motor 48 and thereby apply the brake band 44 to the brake flange 42.

The aforementioned slippage between the clutch plates 24, 26 when the drum 18 is being used for an unspooling operation generates considerable heat. When this heat reaches a level that opens the valve 56, oil will pass through the conduits 50 to cool the clutch plates and thus prevent them from failing through overheating and preserve them for the more demanding operation of inhauling the cable wherein they are pressed against each other under relatively high pressure with no slippage between the clutch plates.

Should the operator find it necessary or desirable, he may at any time cause the valve 56 to open to direct oil to the clutch plates 24, 26 by opening the valve 67 to cause the oil pressure in the conduit 54 to rise above the prescribed pressure needed to open the valve 56.

In addition to cooling the clutch plates, the oil serves to lubricate the clutch plates, thus retarding wear and allowing the slippage between the clutch plates to take place without chatter.

I claim:

1. A cable winch comprising a rotatably mounted shaft; a drum mounted on the shaft for rotation and adapted to have a cable spooled or unspooled thereon; clutch means interposed between the shaft and the drum so constructed as to couple the drum to the shaft under a relatively high force wherein slippage between the drum and the shaft is precluded or to couple the drum to the shaft under a relatively low force wherein slippage between the drum and the shaft is permitted; and control means selectively operable to apply said high force or said low force, whereby said high force may be applied when said drum is spooling the cable and said low force may be applied when said drum is unspooling the cable, and said clutch means further comprising temperature-responsive means for applying oil to the clutch plates in response to the temperature adjacent the clutch plates rising above a prescribed amount, whereby supplying of oil is coordinated with unspooling and clutch plate wear is retarded and chatter is prevented during unspooling.

2. The winch as defined in claim 1 wherein said temperature-responsive means for applying oil comprises: a source of oil under pressure; conduit means interposed between said source and the clutch plates; and a temperature-responsive valve in said conduit means interposed between said source and the clutch plates adjacent the clutch plates.

3. The winch as defined in claim 2 further comprising: a hub attached to the shaft; means mounting the first mentioned clutch plate to the hub; and means locating said temperature-responsive valve in the hub.

4. The winch as defined in claim 3 in which said temperature-responsive valve further comprises means so constructing said valve as to open in response to the application of a prescribed oil pressure; a second valve in said conduit means interposed between said source and the first mentioned valve so constructed as to be set to pass oil therethrough below said prescribed pressure but to be actuable to pass oil therethrough at a pressure greater than said prescribed pressure; and means for actuating said second valve.

5. The winch as defined in claim 1 wherein said means for selectively forcing the clutch plates against each other comprises a source of fluid under pressure; conduit means extending through the shaft to the clutch plates; a first fluid flow path between said source and said conduit means so constructed as to pass said fluid therethrough under relatively high pressure; a second fluid flow path between said source and said conduit means so constructed as to pass said fluid therethrough under relatively low pressure; a first selectively openable valve in said first path; and a second selectively openable valve in said second path.

* * * * *